Figure 1:
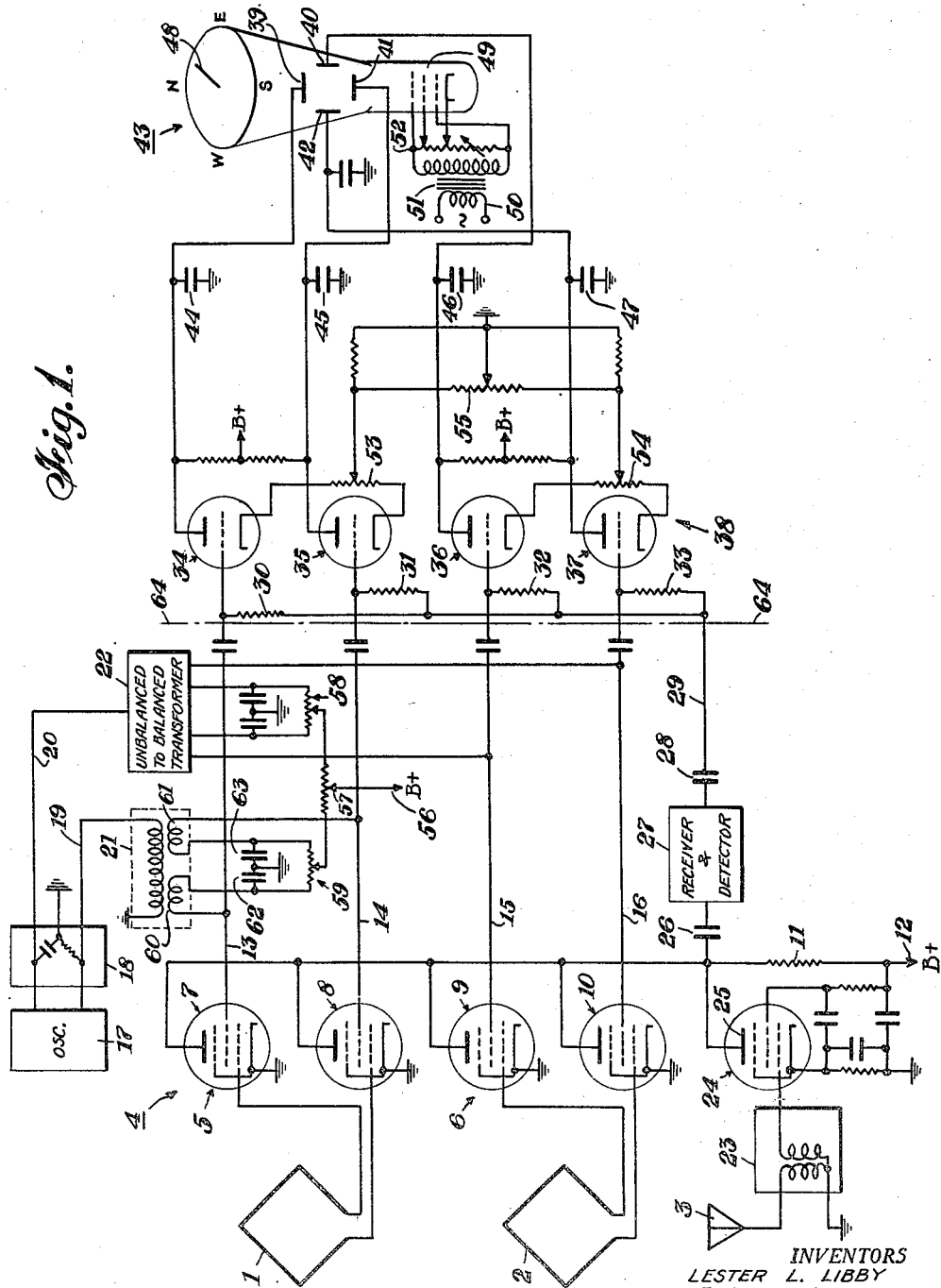

April 3, 1951

L. L. LIBBY ET AL 2,547,028

DIRECTION FINDING SYSTEM

Filed Feb. 14, 1946

2 Sheets-Sheet 1

INVENTORS
LESTER L. LIBBY
EUGENE COLE
BY
ATTORNEY

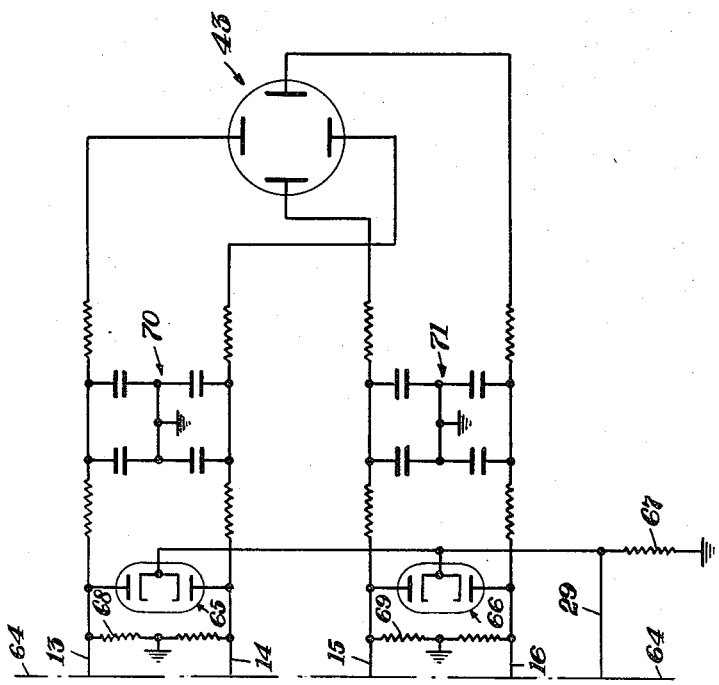

/ Patented Apr. 3, 1951

2,547,028

UNITED STATES PATENT OFFICE 2,547,028

DIRECTION FINDING SYSTEM

Lester L. Libby, East Orange, N. J., and Eugene Cole, Kew Gardens, N. Y., assignors to Federal Telephone and Radio Corporation, New York, N. Y., a corporation of Delaware Application February 14, 1946, Serial No. 647,603

13 Claims. (Cl. 343—121)

This invention relates to direction finding system.

An object of the present invention is the provision of an improved direction finding system.

Another object of this invention is the provision of a direction finding system in which no moving parts are employed.

Another object of this invention is the provision of a direction finding system utilizing a stationary antenna system and a cathode ray tube indicating system in which no moving parts are employed.

Another object of the present invention is the provision of a direction finding system utilizing a stationary antenna system and a cathode ray tube in which the rotation of the field pattern of the antenna system and the rotation of the beam in the cathode ray tube are electronically effected and in which both such effects are controlled by potentials derived from a single source.

Another object of the present invention is the provision of a direction finding system of the type hereinabove described, in which the indication on the cathode ray tube is in the form of a radially extending narrow line.

Another object of the present invention is the provision of a direction finding system of the type hereinabove described in which the rotation of the radiation pattern of the antenna system and the rotation of the beam in the cathode ray tube are positively synchronized.

While our invention itself is defined in the appended claims, other and further objects thereof will become apparent and the invention will be best understood from the following description of an embodiment thereof, reference being had to the drawings, in which:

Fig. 1 is a schematic and block diagram of a direction finding system embodying our invention; and Fig. 2 is a schematic and block diagram showing a modification thereof.

Referring now to Fig. 1, directive reception patterns, such as for example, crossed figure-of-eight radiant action patterns may be produced by any suitable means, such as for example, loop antennas 1 and 2, which are crossed and arranged at right angles to each other and which operate in conjunction with a sensing antenna 3 to provide an unambiguous sense of direction.

The radiation pattern produced by loop antennas 1 and 2 may be effectively rotated by means of an electronic goniometer generally designed by the numeral 4, which consists of two balanced modulators 5 and 6 respectively associated with loops 1 and 2. Balanced modulators 5 and 6 include tubes 7 and 8, and 9 and 10 respectively, which may be for example, pentodes. The ends of loop 1 are connected to the first grids of tubes 7 and 8, while the ends of loop 2 are connected to the first grids of tubes 9 and 10. The cathodes of tubes 7—10 are all connected to ground while the anodes of tubes 7—10 are connected together through a resistor 11 to the positive side of a source of potential whose negative side is connected to ground. The second grids of tubes 7—10 are connected over lines 13—16 respectively to a source of modulating or control voltages.

The control voltages are derived from an oscillator 17 which may operate at a relatively low frequency, such as 20 cycles per second, or whatever frequency it is desired to utilize as the rate of the effective rotation of the radiation pattern of loops 1 and 2. The sinusoidal output of oscillator 17 is fed through a 90° phase shifter 18 to output lines 19 and 20. The potentials on the output lines 19 and 20 with respect to ground are 90° out-of-phase with each other. These 90° out-of-phase voltages, which are unbalanced with respect to ground, are fed through two transformers 21 and 22, which changes them from an unbalanced to a balanced potential with respect to ground. The outputs of transformers 21 and 22 are fed to lines 13 through 16 respectively. The potentials on lines 13 and 14 are 180° out-of-phase with each other; likewise the potentials on lines 15 and 16 are 180° out-of-phase with each other. But it is to be noted that the potentials on lines 13 and 14 are 90° out-of-phase with respect to the potentials on lines 15 and 16. Stated another way and designating the phase of the potential on line 13 as the reference phase, the potential on line 15 lags the reference potential by 90°, the potential on line 14 lags the reference potential by 180° and the potential on line 16 lags the reference potential by 270°. Thus the phases of the potentials on lines 13—16 follow each other sequentially with 90° phase shift in between in the following order: line 13, line 15, line 14 and line 16.

Referring back to the electronic goniometer 4 and to the tubes 7—10 thereof, if loop 1 is oriented in a north-south direction, tube 7 may be assumed to correspond to the north and tube 8 to the south; while since loop 2 is therefore oriented in an east-west direction, tube 9 will correspond to the east and tube 10 will correspond to the west. As the control voltages are applied over line 16 to tubes 7—10 successively reach their peak, it will be seen that tube 7 will first reach its maximum positive potential, then tube 9, then tube 8 and finally tube 10. The effective rotation of the radiant action pattern then will be in a clockwise direction from north to east to south to west. The foregoing is of course dependent upon the sensing antenna 3 to eliminate the usual 180° ambiguity of such pattern. For this purpose, the sensing antenna 3 is connected through an appropriate phase shift coupling arrangement 23 to a pentode amplifier 24 whose anode 25 is connected also in series with resistor 11 to the positive side of the source of potential 12. Thus, it will be seen that the output of sense antenna 3 is properly mixed with the output derived from the loops 1 and 2. The resultant output derived across resistor 11 is then applied through a suitable coupling condenser 26 to a conventional receiver and detector 27 whose output, which is sinusoidal in form, is then applied through a coupling condenser 28 and over a line 29 to one end of the grid resistors 30—33 associated with tubes 34 to 37 of an electronic mixer or distributor 38, the other end of said resistors 30—33 being connected to the grids of tubes 34—37. Distributor 38 is used to mix and distribute the energy to the deflection plates 39—42 of a cathode ray tube 43, in synchronism with the rotation of the radiant action pattern of the antenna system, or in synchronism with goniometer 4. For this purpose, lines 13—16, which carry the control voltage potentials, are coupled respectively to the grids of tubes 34—37. Thus, each of the tubes 34—37 successively reaches its point of maximum conductivity in synchronism with its corresponding one of tubes 7—10 respectively. The anode of tube 34 is connected to the deflecting plate 39 corresponding to a deflection of the beam in a direction designated as north on the screen of cathode ray tube 43, the anode of tube 35 is connected to the south deflection plate 41, the anode of tube 36 is connected to the east deflection plate 40 and the anode of tube 37 is connected to the west deflection plate 42. The anodes of tubes 34—37 are also each connected through condensers 44—47 respectively to ground. These condensers store up the charge as the tubes 34—37 respectively reach their maximum conductivity so as to obtain a deflection corresponding to the peak voltage of the incoming signals. This storage system for indicating devices is more fully described in the copending applications of G. S. Burroughs 3, Serial No. 592,401, filed May 7, 1945, now abandoned, and G. S. Burroughs 6, Serial No. 626,129, filed November 1, 1945, now forfeited.

Assuming that a signal is coming in from the northeast, each time that tubes 34 and 36 conduct, a charge is stored in condensers 44 and 46 respectively, which would tend to deflect the beam in a direction corresponding to the northeast. This deflection, would, in the absence of anything further, be merely a deflection of a spot from the center of the screen. In order to change this spot deflection into a linear or line deflection 48 as illustrated, the voltages applied to the accelerating electrodes 49 are derived from an A. C. source 50 through a transformer 51 and across a voltage divider 52. The application of alternating current to the acceleration electrodes varies the deflection sensitivity of the beam at the frequency of the current derived from source 50. Consequently, at that frequency the beam moves radially from and back to the center of the tube (in a northeasterly direction in the instance hereinabove cited) thus producing the line 48. To assure centering of the beam, the cathodes of tubes 34 and 35 are connected to the opposite ends of the resistors of a potentiometer 53 while the cathodes of tubes 36 and 37 are likewise connected to the opposite ends of the resistors of a potentiometer 54. The arms of potentiometers 53 and 54 are in turn connected to the opposite ends of the resistor of a potentiometer 55 whose arm is connected to ground. By suitably adjusting the arms of potentiometers 53 to 55, the spot can be properly centered.

For proper operation of the system described, it is necessary that each of the balanced modulators 5 and 6 be balanced with respect to the other and with respect to itself. This may be accomplished by controlling the voltages applied to the screen electrodes of tubes 7—10. For this purpose, the source of voltage 56 for controlling the bias of the screens may be applied through the secondaries of transformers 21 and 22 and through the lines 13—16 to the various screen grids. The positive side of source 56 may be connected to an arm of a potentiometer 57 whose resistor is connected at its ends to the arms of two other potentiometers 58 and 59 respectively. Transformers 21 and 22 both have split secondaries and since the circuit coupled to these are alike, only the connections from potentiometer 59 to its associated transformer 21 will be described. The two halves 60 and 61 of the split secondary of transformer 21 have their outer ends connected respectively to lines 13 and 14 while their inner ends are each connected to the ends of the resistor of potentiometer 59. The halves 60 and 61 are coupled to each other at the frequencies involved (the frequency of oscillator 17) by two series condensers 62 and 63 respectively, the midpoint between said condensers being connected to ground. By adjusting the arm of potentiometer 59, tubes 7 and 8 are balanced with respect to each other. Likewise by adjusting the arm of potentiometer 58, tubes 9 and 10 are balanced with respect to each other. Finally by adjusting the arm of potentiometer 57, balanced modulator 5 is balanced with respect to balanced modulator 6.

One advantage of the system herein described is that it is not necessary for the modulator tubes to be selected for their characteristics. Any distortion introduced by the modulators will not substantially affect the bearing indications. It is only necessary to balance the modulators for modulation sensitivity. This is due to the fact that in the process of demodulation, the reference voltages, that is, the voltages derived from oscillator 17, are combined with the receiver output. The result is that new voltages are produced equal to the sums and difference frequencies of the applied and reference voltages. Since the frequencies are identical, the difference frequency is zero or direct current. This will cause a resultant deflection of the indicator. Any new frequencies produced (i. e. sums, etc.) will not change the D. C. level since the condensers 44—47 serve as a short to ground for alternating current.

While in the system illustrated in Fig. 1, the demodulator is disclosed as consisting of four triodes, it is possible to substitute in place thereof four diodes. The use of diodes has the advantage that balancing of the diodes becomes unnecessary, and centering of the spot in the cathode ray tube may be accomplished magnetically. It is preferred to operate the diodes with large signals so that their characteristics are essentially linear. Therefore no balancing controls are necessary for the demodulators and the diodes may be changed without affecting the accuracy or calibration of the system. For this purpose, the portion of the system of Fig. 1 to the right of the dotted line 64—64 may be replaced by the arrangement illustrated in Fig. 2.

In Fig. 2, lines 13 and 14 are connected to the anodes of a double diode 65 while lines 15 and 16 are connected to the anodes of a double diode 66. The cathodes of double diodes 65 and 66 are connected together and through line 29 to the output of the receiver, with the potential applied to the cathodes being developed across a resistor 67 connected to ground. D. C. returns 68 and 69 are associated with diodes 65 and 66 respectively, each consisting of a pair of resistors connecting the anodes of its associated diodes with the midpoint between said resistors connected to ground. The output of diodes 65 and 66 is applied to the deflection plates of the cathode ray tube 43 through low pass filters 70 and 71, each of which is balanced with respect to ground. The low pass filters 70 and 71 eliminate any alternating current output and only permit the D. C. potentials to be applied to the deflection plates.

It is preferred in both embodiments that the output of oscillator 17, as applied to the demodulators, be very much greater than the output derived from the receiver, and may be for example, twice or several times as large as the output of the receiver. For this purpose, suitable amplifiers (not shown) may be interposed between oscillator 17 and the transformers 21 and 22. This makes the frequency of oscillator 17 the dominant frequency in the beating phenomena in the demodulators and lessens the possibility of any other frequency producing a D. C. output.

While we have described above the principles of our invention in connection with specific apparatus, it is to be clearly understood that this description is made only by way of example and not as a limitation on the scope of our invention.

We claim:

1. A direction finder comprising an antenna system having a plurality of directive radiant action patterns, a plurality of modulators, means for applying energy derived from said antenna system in accordance with each of said patterns to the input of separate ones of said modulators, a source of modulating voltages having a plurality of outputs with each of said outputs being displaced in phase with respect to the others, means for separately applying the outputs from said source to separate ones of said modulators to produce in effect an azimuthal shifting of the radiant action patterns, a receiver, means coupling the outputs of said modulators to said receiver, an electronic distributor having a plurality of electron discharge devices, means coupling the output of said receiver to each of said devices in parallel, means applying the outputs from said source to separate ones of said devices to control the conductivity thereof, a cathode ray tube including a plurality of means for deflecting the beam, each deflecting the beam in different directions and means for separately applying the outputs from said devices to separate ones of said deflection means.

2. A direction finder according to claim 1 further including a sensing antenna, phase shifting means associated with said sensing antenna and means for coupling the output of said sensing antenna to said receiver.

3. A direction finder according to claim 1, wherein said cathode ray tube includes a plurality of accelerating electrodes, a source of alternating current voltages and means for applying said alternating current voltages to said accelerating electrodes to produce a cyclically varying change in the deflection sensitivity of the beam.

4. A direction finder according to claim 1, wherein said antenna system comprises a pair of crossed loops providing a pair of crossed figure-of-eight radiant action patterns.

5. A direction finder according to claim 1, wherein said antenna system comprises a pair of crossed loops providing a pair of crossed figure-of-eight radiant action patterns and said modulators are comprised of two pairs of balanced modulators, each of said balanced modulators being coupled in push-pull to the ends of one of said loops.

6. A direction finder according to claim 1, wherein said antenna system comprises a pair of crossed loops providing a pair of crossed figure-of-eight radiant action patterns and said modulators are comprised of two pairs of balanced modulators, each of said balanced modulators being coupled in push-pull to the ends of one of said loops, and said source of modulating voltages comprises means for producing four phases of potential with respect to ground, with each phase being successively displaced 90° with respect to the preceding phase, and means for applying each of the pairs of resulting potentials of 180° phase displacement in push-pull to separate ones of said balanced modulators to produce in effect a rotation of the radiant action patterns.

7. A direction finder according to claim 1, wherein said plurality of deflecting means is comprised of two pairs of spaced deflection plates arranged at right angles to each other, each plate being adapted to produce a deflection of the beam in one radial direction from the center.

8. A direction finder comprising an antenna system having a pair of crossed figure-of-eight radiant action patterns, a pair of balanced modulators, means for applying energy derived from said antenna system in accordance with each of said patterns in push-pull to the input of separate ones of said modulators, a source of modulating voltages having dual outputs of voltages with one output displaced substantially 90° in phase with respect to the other, and each output having two leads 180° out-of-phase with respect to each other and balanced with respect to ground, means separately applying the outputs from said source in push-pull to separate ones of said balanced modulators to produce in effect a rotation of the radiant action patterns, a sensing antenna including phase shifting means, a receiver, means coupling the outputs of said modulators and sensing antenna to said receiver, an electronic distributor having four electron discharge devices, means coupling the output of said receiver to each of said devices in parallel, means coupling the leads from said source to separate ones of said devices to control the conductivity thereof, a cathode ray tube including four deflection plates for deflecting the beam in orthogonal coordinates, and means for separately applying the output from said devices to separate ones of said deflection plates.

9. A direction finder according to claim 8, wherein said cathode ray tube includes accelerating electrodes, a source of alternating current voltages, and means for applying said alternating current voltages to said accelerating electrodes to cyclically vary the deflection sensitivity of the beam of said cathode ray tube.

10. A direction finder comprising an antenna system providing a directive radiant action pattern, a local oscillator, means for modulating the energy derived from said antenna system with that derived from said local oscillator, a receiver responsive to the output of said modulator, a mixer for mixing the output of said receiver with energy from said oscillator to thereby produce direct current voltages and alternating current components, means for filtering out said components, a cathode ray tube, and means for applying said direct current voltages to deflect the beam in said tube.

11. A direction finder according to claim 10 wherein said modulating means comprises two pairs of balanced modulators, and means for shifting the phase of oscillations derived from said local oscillator to produce an effective rotation of the directive radiant action pattern.

12. A direction finder according to claim 10 wherein said mixer is comprised of a plurality of diodes, and said filtering means comprises a plurality of low pass filters connected to the outputs of said diodes.

13. A direction finder according to claim 10 wherein said modulating means comprises two pairs of balanced modulators, phasing means for shifting the phase of energy derived from said local oscillator so as to produce potentials of four different phases, each substantially 90° displaced from each other, and means for applying the output of said phasing means to said balanced modulators to produce an effective rotation of the directive pattern of said antenna system, said mixer being comprised of four diodes, to each of which a separate phase of energy derived from the local oscillator is applied from the output of the phasing means, and means coupling the output of said receiver to said mixer, the outputs of said local oscillator having a substantially larger amplitude than the output of said receiver.

LESTER L. LIBBY.
EUGENE COLE.

REFERENCES CITED

The following references are of record in the file of this patent:

UNITED STATES PATENTS

| Number | Name | Date |
| --- | --- | --- |
| 2,238,129 | Paul | Apr. 15, 1941 |
| 2,266,038 | Hinman | Dec. 16, 1941 |
| 2,274,546 | Hugenholtz | Feb. 24, 1942 |
| 2,400,641 | Hardy | May 21, 1946 |
| 2,406,858 | Shepherd et al. | Sept. 3, 1946 |
| 2,408,039 | Busignies | Sept. 24, 1946 |
| 2,408,414 | Donaldson | Oct. 1, 1946 |
| 2,422,073 | Bond | June 10, 1947 |
| 2,443,718 | Blodgett | June 22, 1948 |
| 2,450,014 | Newitt | Sept. 28, 1948 |